(12) United States Patent
Smith et al.

(10) Patent No.: US 11,883,955 B1
(45) Date of Patent: Jan. 30, 2024

(54) POWER ON SELF TEST FOR BRAKES IN AN AUTONOMOUS DELIVERY ROBOT

(71) Applicant: Amazon Technologies, Inc., Seattle, WA (US)

(72) Inventors: Geoffrey John Smith, Seattle, WA (US); Aninda Kanti Sen, Issaquah, WA (US); Joseph C. Hager, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 643 days.

(21) Appl. No.: 17/118,235

(22) Filed: Dec. 10, 2020

(51) Int. Cl.
  *B25J 19/00* (2006.01)
  *G05B 19/406* (2006.01)
  *G01B 21/22* (2006.01)

(52) U.S. Cl.
  CPC .......... *B25J 19/0095* (2013.01); *G01B 21/22* (2013.01); *G05B 19/406* (2013.01); *G05B 2219/31006* (2013.01); *G05B 2219/41279* (2013.01); *G05B 2219/50391* (2013.01)

(58) Field of Classification Search
  CPC ............... B25J 19/0095; G05B 19/406; G05B 2219/50391; G05B 2219/41279; G05B 2219/31006; G01B 21/22
  See application file for complete search history.

(56) References Cited

U.S. PATENT DOCUMENTS

| 11,059,373 B1* | 7/2021 | Claretti | ................... G01S 17/86 |
| 2015/0274027 A1* | 10/2015 | Crombez | ............... B60L 58/20 |
| | | | 903/903 |

* cited by examiner

*Primary Examiner* — Aditya S Bhat
(74) *Attorney, Agent, or Firm* — Kilpatrick Townsend & Stockton LLP

(57) ABSTRACT

Techniques and apparatus for performing a power-on self-test for a braking system in an autonomous delivery robot are described. One technique includes moving each wheel of the autonomous delivery robot in a first direction in accordance with predefined criteria, while brake module(s) of the braking system are engaged to one or more of the wheels to stop movement of the one or more wheels. A first amount of movement of at least a first wheel that is engaged to a first brake module is determined. Upon determining that the first amount of movement satisfies a predetermined condition, a determination is made that the braking system has failed the test and the brake module(s) of the braking system are kept in an engaged state.

20 Claims, 13 Drawing Sheets

POWER ON SELF TEST FOR BRAKES IN AN AUTONOMOUS DELIVERY ROBOT

BACKGROUND

The present invention relates to delivery devices, and more specifically, to techniques for testing a braking system of a delivery device.

Many companies package and ship items (e.g., books, apparel, food, electronics, etc.) and/or groups of items in order to fulfill order requests from customers. For example, ordered items are typically packed in shipping packages and shipped to the customer's residence or place of business. The delivery of physical items to a customer's specified location is traditionally accomplished using a delivery system that includes a human controlled truck, human operated bicycle, human operated cart, etc. In some cases, delivery devices (e.g., robots, autonomous ground vehicles (AGVs), personal delivery devices, etc.) can be used to aid the delivery of items to specified locations (e.g., users' residences). For example, a delivery device can retrieve an item(s) from a loading area (e.g., transportation vehicle, facility, etc.) and travel to a specified delivery location (e.g., user residence, business, etc.) to deliver the item. The delivery device can return back to the loading area when the item has been delivered.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
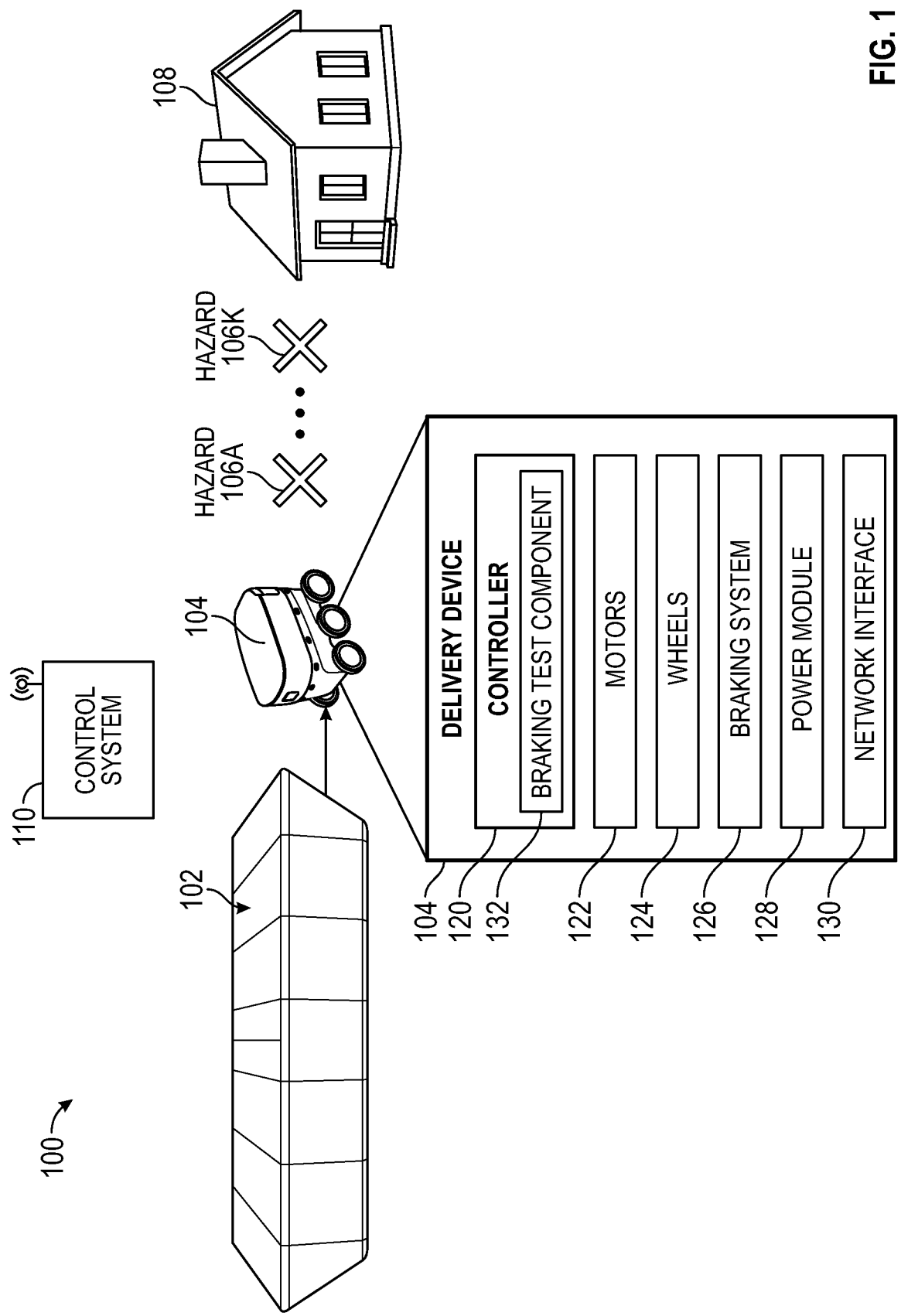
FIG. 1 illustrates an example environment in which one or more delivery devices are deployed to deliver items, according to one embodiment.

Embodiments herein describe a system and technique for testing a braking system of a delivery device. For example, a delivery device can encounter various different types of safety hazards when traveling to a location (e.g., delivery location, dispatch (or hub) location, etc.). Examples of such safety hazards can include, but are not limited to, weather hazards (e.g., thunderstorms, hail, wind, etc.), road (or sidewalk) hazards (e.g., ice, potholes, uneven road segments, steep inclines, hills, etc.), traffic hazards (e.g., pedestrian activity), and the like. In response to detecting a hazard, the delivery device should be able to consistently apply its brakes in order to stop its movement, e.g., to mitigate accidents (or damage) to pedestrians and/or property.

Embodiments herein describe a system and technique for testing a braking system of a delivery device. In one embodiment, the braking system(s) of one or more delivery devices can be tested in an automated manner, e.g., without human intervention. For example, embodiments can perform a power-on self-test (POST) of the braking system on a delivery device, upon detecting that the delivery device is powered on and that the delivery device is in a state to drive its wheels (e.g., power is being supplied to motors of the delivery device).

When the power-on self-test succeeds (or passes), embodiments can disengage the braking system to allow the delivery device to operate, e.g., in response to movement commands. On the other hand, when the power-on self-test fails, embodiments can put the delivery device in an inactive state where the delivery device is powered down, the braking system is engaged, and the delivery device is not able to accept movement commands (or instructions). Additionally or alternatively, when the power-on self-test fails, embodiments can turn on one or more light sources on the delivery device (e.g., flash lights on the delivery device to indicate to pedestrians that the delivery device is in a failed or inactive state), send information regarding the status of the braking system to a control (or management) system (e.g., to alert maintenance personnel, initiate a recovery operation, etc.), etc.

In this manner, embodiments provide an autonomous system that can reliably and efficiently test the braking systems on one or more delivery devices, e.g., without human intervention. For example, embodiments can detect when the braking system on a given delivery device has failed, when the braking system on a given device is operating below a pre-defined standard, etc. Note that as used herein, a delivery device may also be referred to as an AGV, a robot, a delivery robot, a personal delivery device, an autonomous delivery robot, etc. Further, as used herein, the delivery device and/or one or more components of the delivery device (e.g., braking system, brake module(s), etc.) may be unpowered when power to the delivery device and/or one or more components of the delivery device is less than a threshold power. Similarly, the delivery device and/or one or more components of the delivery device (e.g., braking system, brake module(s), etc.) may be powered (or powered on) when power to the delivery device and/or one or more components of the delivery device is greater than or equal to the threshold power.

FIG. 1 illustrates an example environment 100 in which one or more delivery devices 104 can be deployed to deliver items, according to one embodiment. For example, the environment 100 can be an outdoor environment in which a delivery device 104 is moving on a sidewalk (or other type of terrain). As shown, the environment 100 includes a dispenser 102 (or hub apparatus), a delivery device 104, and a control system 110. Note that, for the sake of clarity, a single delivery device 104 is depicted in FIG. 1. In other embodiments, multiple delivery devices 104 can be deployed in the environment 100.

The dispenser 102 can be used for housing and dispatching delivery devices 104. In one embodiment, the dispenser 102 may be located in a geographical area in proximity to one or more delivery locations, such as delivery destination 108. Although the dispenser 102 is illustrated with a particular configuration in FIG. 1, note that the dispenser 102 can have a variety of different configurations (e.g., shape, material, angle, height, covering (or housing), etc.) suitable for docking one or more delivery devices 104. In some embodiments, for example, the dispenser 102 can include docking station(s) that provide charging and/or network connectivity for the delivery devices 104 docked in the station(s). In some examples, the dispenser 102 can be enclosed (as shown in FIG. 1), open, or at least partially covered by another structure.

The control system 110 can include hardware components, software components, or combinations thereof. For example, although not shown, the control system 110 can include a controller, network interface, etc., for controlling operation of the dispenser 102 and/or delivery devices 104. In some embodiments, one or more components of the control system 110 may be distributed across one or more computing systems in a cloud environment. In some embodiments, the control system 110 can control operation of the dispenser 102, e.g., via control signals (or commands) transmitted to the dispenser 102 over a network. For example, the control system 110 can provide control signals (or commands) to the dispenser 102 to open and close access barriers of the dispenser 102 to allow delivery devices 104 to enter and exit the dispenser 102, engage and disengage locking mechanisms at one or more docking stations within the dispenser 102, etc.

In some embodiments, the control system 110 can control operation of the delivery device 104, e.g., via control signals (or commands) transmitted to the delivery device 104 over a network. For example, the control system 110 can instruct one or more of the delivery devices 104 to enter and/or exit the dispenser 102, instruct one or more of the delivery devices 104 to transition to a particular docking station or other location within the dispenser 102, instruct one or more of the delivery devices 104 to travel to a particular location (e.g., delivery destination 108, dispatch location, etc.), power up one or more of the delivery devices 104 (including one or more components of the delivery devices 104), power down one or more of the delivery devices 104 (including one or more components of the delivery devices 104), instruct one or more of the delivery devices 104 to perform a power-on self-test of its braking systems while in the dispenser 102 and/or outside of the dispenser 102, etc.

In the embodiment depicted in FIG. 1, a delivery device 104 may receive an item (e.g., at the dispenser 102 or from another location) and be dispatched to a delivery destination 108 (e.g., a residence, a business, etc.) in order to deliver the item. The delivery device 104 includes a controller 120, one or more motors 122, a set of wheels 124, a braking system 126, a power module 128, and a network interface 130. The controller 120 controls the operation of the delivery device 104, e.g., based on signals received via the network interface 130 from the control system 110 and/or from another computing system (not shown). Although not shown, the delivery device 104 may also include one or more sensors that enable the delivery device 104 to detect hazards that may be in a travel path of the delivery device 104, enable the delivery device 104 to navigate to a location, etc. The sensors can include, but are not limited to, image (camera) sensors, thermal sensors, infrared sensors, position/location (e.g., GPS) sensors, weather sensors, time of travel sensors, accelerometers, sound sensors, proximity sensors, etc. Using the sensors, the delivery device 104 can detect hazards (e.g., debris, doors, persons, traffic, etc.) in its travel path, navigate around the obstacles, and the like.

The delivery device 104 is equipped with a set of wheels 124. In one particular embodiment, the delivery device 104 includes six wheels, where two of the six wheels are positioned at the front of the delivery device 104, another two of the six wheels are positioned at the middle of the delivery device 104, and the last two of the six wheels are positioned at the back of the delivery device 104. Note, however, that the delivery device 104 can be equipped with any number of wheels 124 in any particular configuration. In one embodiment, one or more of the wheels 124 may be omni-directional (omni) wheels. As used herein, an omni wheel refers to a wheel with multiple small discs (or rollers) around the circumference of the wheel that are perpendicular to the turning direction. The omni-wheel can enable the delivery device 104 to move in all directions.

The delivery device 104 is also equipped with a set of motors 122. In some embodiments, each wheel 124 may be coupled to a different motor 122. In some embodiments, multiple wheels (e.g., two wheels) may be coupled to the same motor 122. The motor 122 can include, for example, an alternating current (AC) motor, direct current (DC) motor, servo motor, gear motor, etc. In one embodiment, each motor 122 is a DC gear motor with a rotatable shaft that drives (e.g., rotates) the wheel(s) 124 coupled to the motor 122 in a particular direction (e.g., forwards or backwards).

The braking system 126 of the delivery device 104 can be activated (or engaged) to stop movement of the delivery device 104. As described in more detail below, the braking system 126 is configured as an emergency braking system that can stop the wheeled motion of the delivery device in the event of an emergency (e.g., hazard) and/or a power failure. For example, in general, when the delivery device 104 is powered on and power is supplied to various components (e.g., the motors 122, the braking system 126, etc.) of the delivery device 104 (e.g., power to the braking system 126 is greater than or equal to a threshold), the braking system 126 may disengage from one or more wheels 124 of the delivery device 104, allowing the delivery device 104 to move in response to commands. When power to the motors and/or braking system 126 is removed (e.g., power to the braking system 126 is less than a threshold) due to power failure, a power down command from the controller 120, absence of a power up command from the controller 120, etc., the braking system 126 may engage to one or more wheels 124, stopping movement of the delivery device 104. The braking system 126 may stay engaged while the delivery device 104 is in a powered-off state (or unpowered state) (e.g., power to the delivery device 104 and the braking system 126 is below a threshold). For example, the delivery device 104 may be in the powered-off state while parked. As also described in more detail below, the braking system 126 may also provide a manual override mode (or state) that allows for manually moving the delivery device 104, e.g., when the delivery device 104 is in an unpowered state. The components of the braking system 126 are described in more detail in FIG. 2.

The power module 128 provides power to the components (e.g., controller, motor(s), etc.) of the delivery device 104. The power module 128 may be in the form of battery power, solar power, gas power, super capacitor, fuel cell, or a combination thereof. The power module 128 can be recharged at the dispenser 102 using various techniques. The power module 128 can include power regulators, transformers, capacitors, inductors, wiring, etc. In one embodiment, the power module 128 can be controlled by the controller 120 (e.g., via one or more commands) to supply power to components (e.g., braking system 126) of the delivery device 104 or remove power from the components (e.g., braking system 126) of the delivery device 104. The network interface 130 may communicate using a wireless communication protocol (e.g., WiFi, LTE, 5G, etc.).

While traveling to and/or from the delivery destination 108, the delivery device 104 can encounter one or more safety hazards 106 A-K. In one example, the delivery device 104 may encounter a pothole in the sidewalk. In another example, a pedestrian may be in the traveling path of the delivery device 104. In another example, the delivery device 104 may encounter a physical obstruction (e.g., tree branch, door, debris, broken steps, etc.). In another example, the delivery device 104 may (temporarily) lose power, due to a power failure event.

In some cases, in response to detecting a hazard, the delivery device 104 may engage (or activate) its braking system 126 in order to stop movement of the delivery device 104. Thus, prior to operating a delivery device 104, it may be desirable to verify that the braking system 126 on the delivery device 104 is working properly, e.g., to prevent an accident and/or damage to pedestrians and/or property. In one embodiment described herein, the controller 120 of the delivery device 104 includes a braking test component 132, which is configured to perform an automated test of the braking system 126 on the delivery device 104 to determine whether the braking system 126 is operating properly. In one embodiment, the braking test component 132 automatically performs a test (e.g., a power-on self-test) of the braking system 126, e.g., upon power-up of the delivery device 104 and power-up of the motors 122. In another embodiment, the braking test component 132 performs a test of the braking system 126, e.g., in response to a command from the control system 110. The braking test component 132 can be configured to keep the braking system 126 engaged with the wheel(s) 124 of the delivery device 104, while performing the test of the braking system 126. If the test of the braking system 126 fails, the braking system 126 may stay engaged and the delivery device 104 can be put in an inactive state where it is not able to accept commands to move. If the test of the braking system 126 succeeds, the braking system 126 may disengage and the delivery device 104 may proceed to operate, e.g., travel to a delivery destination 108.

Figure 2:
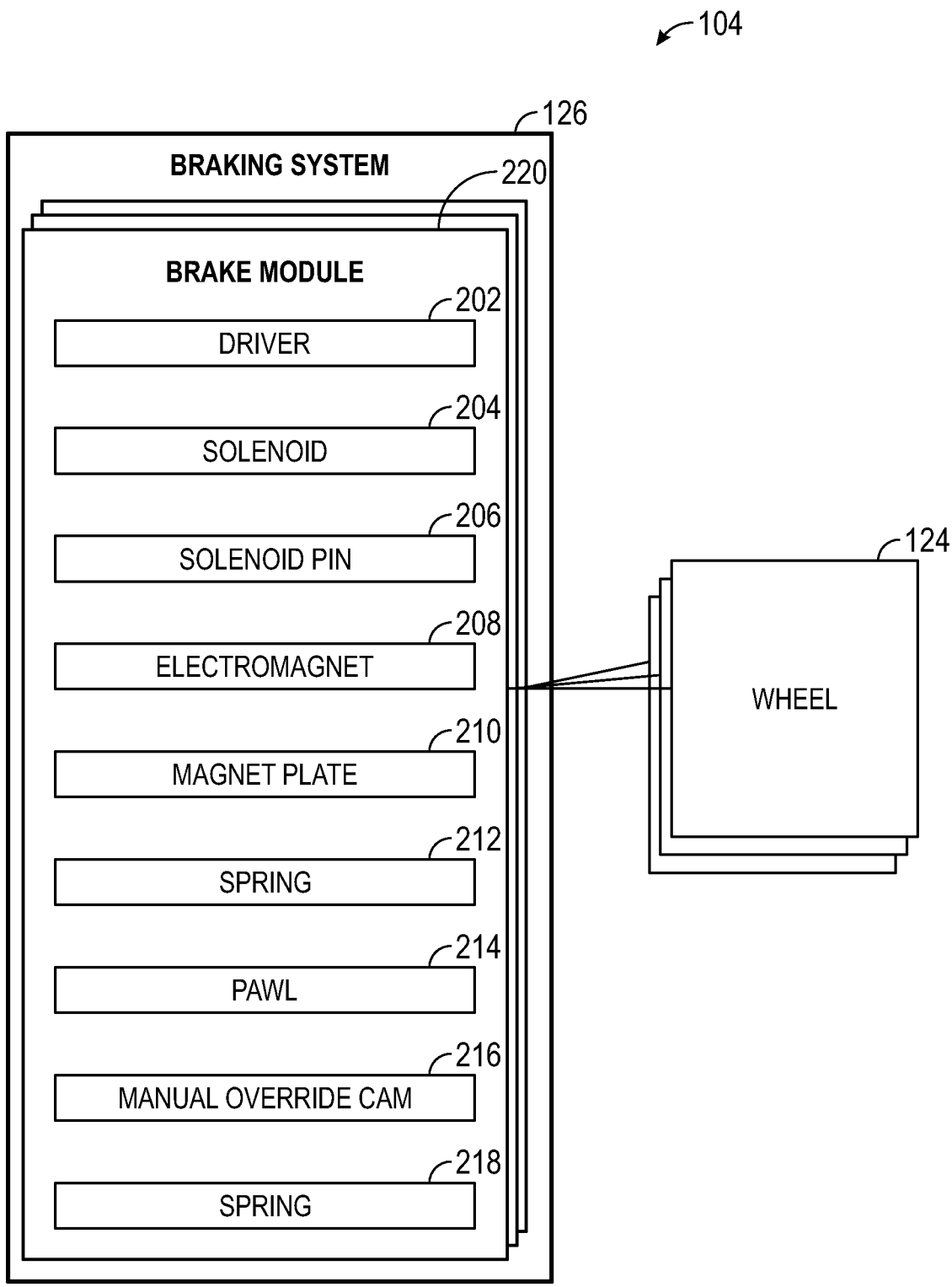
FIG. 2 further illustrates components of the delivery device described relative to FIG. 1, according to one embodiment.

FIG. 2 further illustrates components of the braking system 126 described relative to FIG. 1, according to one embodiment. As shown, the braking system 126 includes one or more brake modules 220, each of which is configured to couple to a different wheel 124 of the set of wheels 124 of the delivery device 104. For example, as described below, each brake module 220 is configured to engage the wheel 124 coupled to the brake module 220 in order to stop the movement (or rotation) of the wheel 124, e.g., when the brake module 220 is unpowered due to a command and/or power failure event.

In one embodiment, the number of brake modules 220 is equal to the number of wheels 124 of the delivery device 104 (e.g., a brake module 220 is included for each wheel 124). In one embodiment, the number of brake modules is less than the number of wheels 124 of the delivery device 104 (e.g., a brake module 220 is included for each of a subset of the wheels 124). In one particular embodiment, the delivery device 104 includes four brake modules 220 and six wheels 124. In this embodiment, the four brake modules 220 may be used for the two front wheels 124 and the two middle wheels 124 of the delivery device 104.

Each brake module 220 includes a driver 202, a solenoid 204, a solenoid pin 206, an electromagnet 208, a magnetic plate 210 (also referred to as a magnet plate), a spring 212, a pawl 214, a manual override cam 216, and a spring 218, which are described in more detail below. Each brake module 220 may be configured as an emergency brake that engages with its respective wheel 124 to stop movement (or rotation) of the wheel 124. In some cases, the brake module 220 can engage its wheel 124, based on a command (or absence of a command) from the driver 202. The driver 202, for example, can refrain from powering the brake module 220, when a hazard is encountered, when the delivery device 104 is parked, etc. In other cases, the brake module 220 can engage its wheel 124 due to a power failure event, e.g., which causes power to be cut off to the brake module 220.

In one embodiment, the brake module 220 may engage (or couple) to the wheel 124 via the pawl 214. For example, the wheel 124 may be configured with cogs on a (center) hub portion of the wheel 124 and slots (or notches) between the cogs. The brake module 220 can engage the wheel 124 (via the pawl 214) in one of the slots between the cogs on the hub portion of the wheel 124, e.g., to stop motion of the wheel 124.

In one embodiment, the driver 202 is configured to control when the brake module 220 engages the wheel 124 and disengages from the wheel 124. For example, the driver 202 can trigger the pawl 214 to disengage from the wheel 124 by activating the solenoid 204 and the electromagnet 208. Once the pawl 214 is disengaged from the wheel 124, the driver 202 can deactivate the solenoid 204 while keeping the electromagnet 208 activated to hold (or retain) the pawl 214 disengaged from the wheel 124. The driver 202 can trigger the pawl 214 to engage the wheel 124 by deactivating the electromagnet 208. The driver 202 may control the brake module 220 in response to a command from the controller 120. In one embodiment, a user can manually control when the brake module 220 engages the wheel 124 or disengages the wheel 124 by engaging a lever (not shown in FIG. 2) coupled to the manual override cam 216.

Figure 3A:
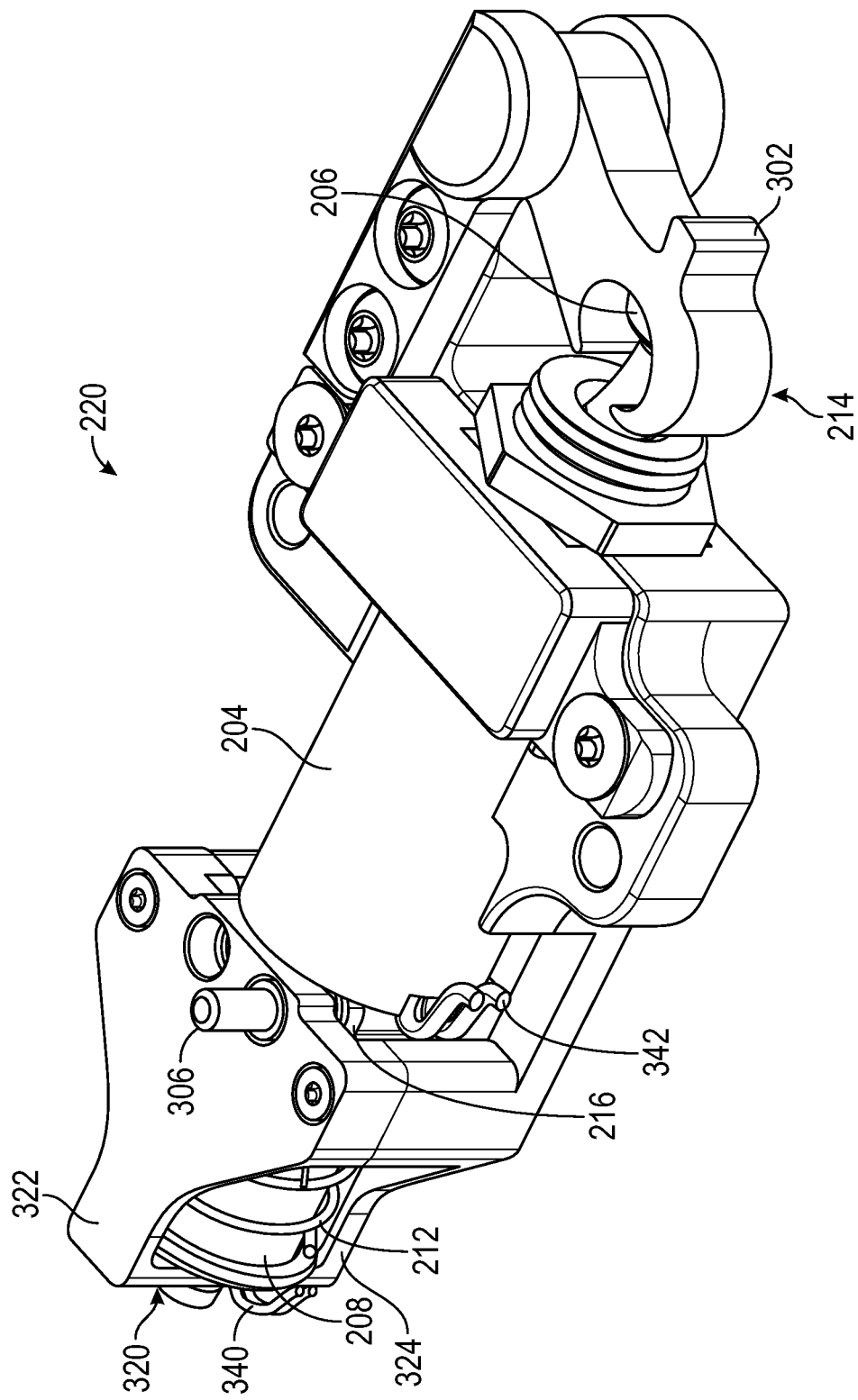
FIG. 3A illustrates a connected view of a brake module of a delivery device, according to one embodiment.
Figure 3B:
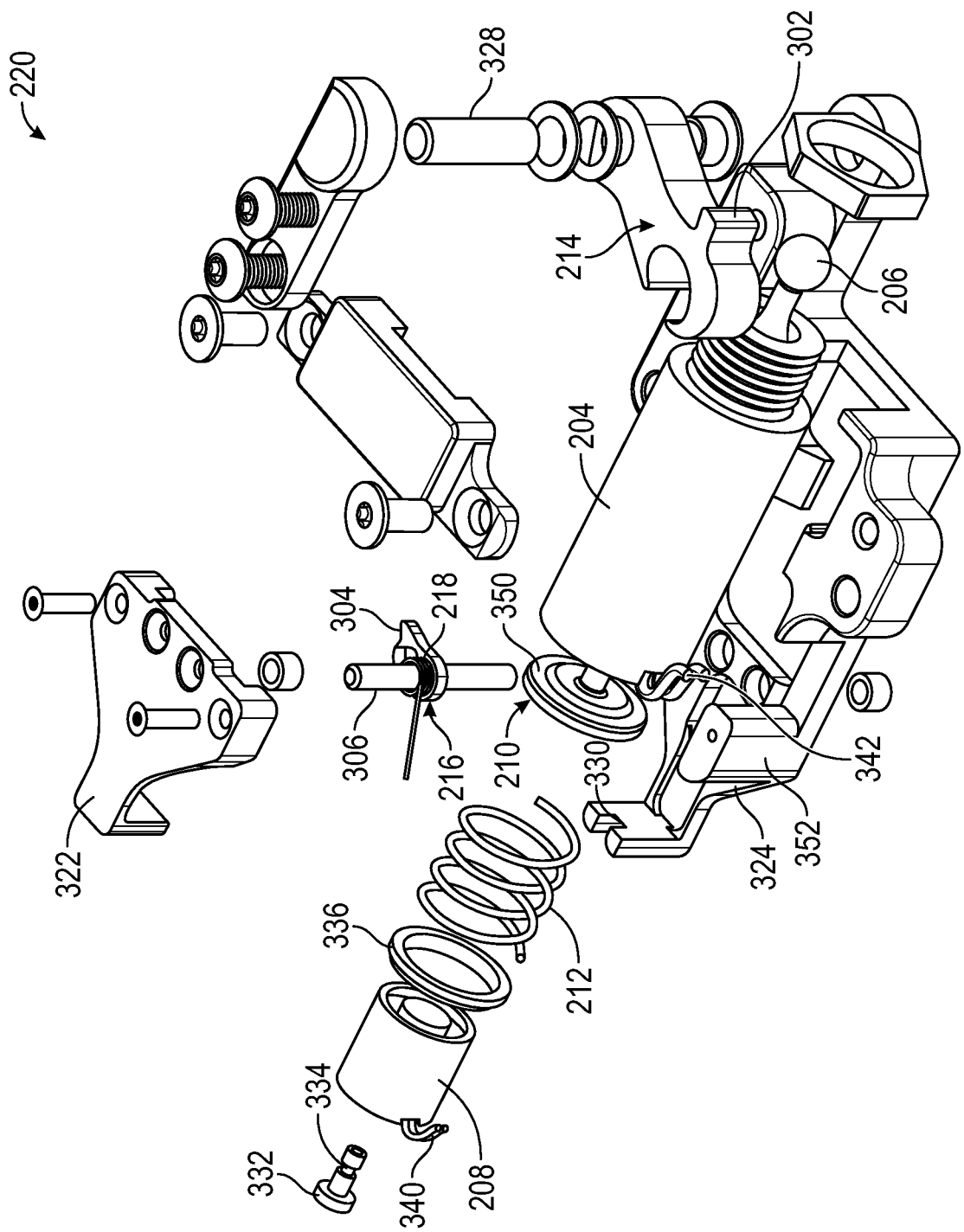
FIG. 3B illustrates an exploded view of a brake module of a delivery device, according to one embodiment.
Figure 3C:
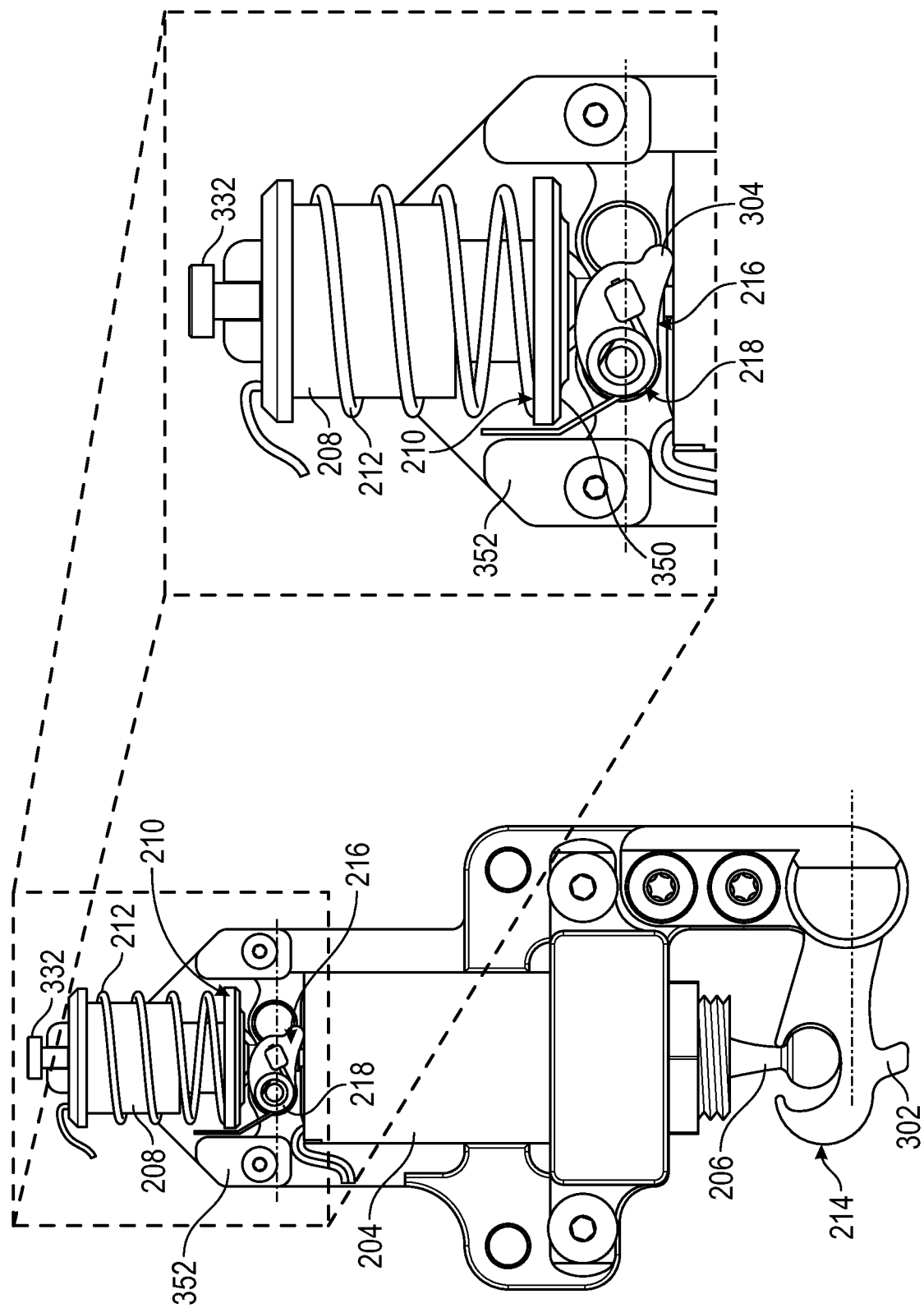
FIG. 3C illustrates a top view of a brake module of a delivery device, according to one embodiment.

FIGS. 3A, 3B, and 3C illustrate an example configuration of the brake module 220, according to one embodiment. In particular, FIG. 3A depicts a connected view of the brake module 220, FIG. 3B depicts an exploded view of the brake module 220, and FIG. 3C depicts a top view of the brake module 220, according to one embodiment. As shown, the pawl 214 of the brake module 220 is coupled to a shaft 328 at one end of the pawl 214 and its coupled to the solenoid pin 206 at the other end of the pawl 214. The pawl 214 is configured to pivot around the shaft 328 to engage a wheel 124 or disengage from a wheel 124. For example, the pawl 214 includes a tooth 302 (also referred to as a toothed portion), which is configured to engage a wheel 124 in one of the slots (or notches) between the cogs of the wheel 124 (not shown in FIGS. 3A, 3B, and 3C).

The solenoid pin 206 is at least partially disposed within the solenoid 204. One end of the solenoid pin 206 is coupled to the pawl 214 and another end of the solenoid pin 206 is coupled to the magnetic plate 210. The spring 212 is attached to the magnetic plate 210 at one end of the spring 212 and is attached to the electromagnet 208 at another end of the spring 212 via the spacer 336. The solenoid 204 may be electrically coupled to the driver 202 (not shown) (e.g., via wires 342) and the electromagnet 208 may be electrically coupled to the driver 202 (not shown) via wires 340.

The brake module 220 includes a frame 320, which is used to support one or more components of the brake module 220. As shown, the frame 320 includes a support member 322 and a support member 324. The support member 324 provides a bottom support for the solenoid 204 and the electromagnet 208. The support member 322 provides an upper support for the electromagnet 208. As shown, the electromagnet 208 is partially enclosed by the support member 322 and the support member 324. For example, the support member 322 is connected to the support member 324 over the portion of the support member 324 that provides bottom support for the electromagnet 208.

As shown in FIG. 3B, the support member 324 includes a cutout region 330, which is used to provide support for a connector 332 (also referred to as a fastener) (e.g., a threaded screw). The connector 332 is used to attach the electromagnet 208 of the brake module 220 to the support structure (e.g., a brake assembly not shown in FIGS. 3A-3C) for the brake module 220. For example, the connector 332 includes a grooved portion 334, which sits in the cutout region 330 when the support member 322 is attached to the support member 324.

The manual override cam 216 is coupled to a shaft 306 (e.g., a cam shaft) and is positioned between the solenoid 204 and the electromagnet 208. In particular, as shown in FIG. 3C, the manual override cam 216 is positioned over the shaft 306 and between the solenoid 204 and the electromagnet 208. In one embodiment, the shaft 306 is connected to a lever (not shown) that is accessible to a user and that allows the user to rotate the shaft 306. The rotation of the shaft 306 causes the manual override cam 216 to rotate and engage the magnetic plate 210. For example, the manual override cam 216 includes a pivot 304 (also referred to as an elongated portion or cam lobe) that can engage the magnetic plate 210 in a detent region 350 of the magnetic plate 210. As described below, when the manual override cam 216 is engaged, the pivot 304 displaces the magnetic plate 210 towards the electromagnet 208, retracting the solenoid pin 206 and disengaging the pawl 214 from the wheel 124.

The spring 218 is positioned over the shaft 306 and is in contact with the manual override cam 216. In one embodiment, the spring 218 is a torsion spring, which has one end (or leg) attached to a surface of the manual override cam 216 and has another end (or leg) that can be positioned within a gap between the solenoid 204 and a shoulder member 352 of the support member 324 of the frame 320. As described below, the spring 218 can be used to return the manual override cam 216 to a normal operating position (or unused state), in the event power is supplied to the brake module 220 while the manual override cam 216 is still engaged with the magnetic plate 210.

Figure 4A:
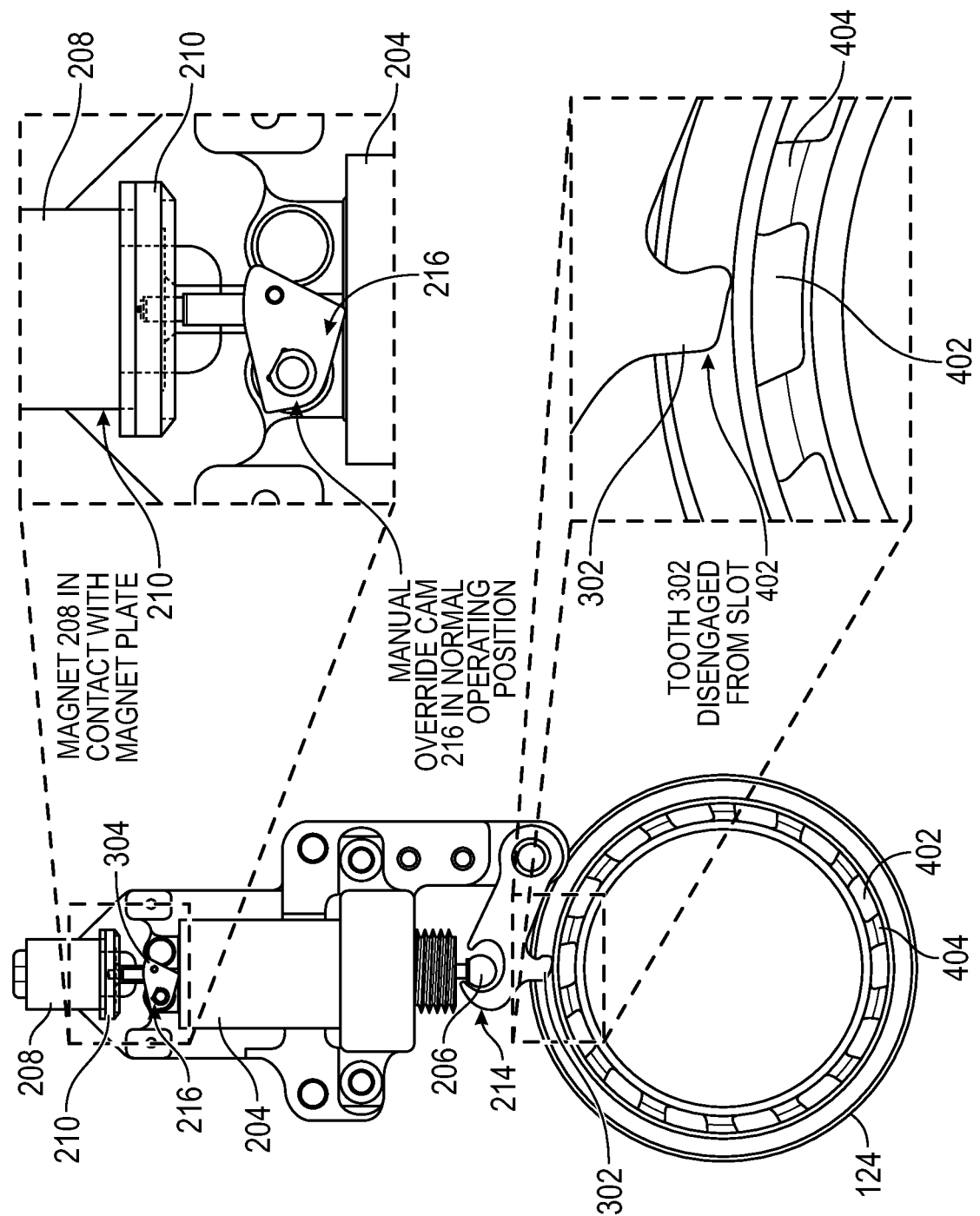
FIG. 4A illustrates an example brake module disengaged from a wheel of a delivery device, according to one embodiment.

FIG. 4A illustrates an example configuration of a brake module 220 disengaged from a wheel 124 of a delivery device 104, according to one embodiment. In this embodiment, the wheel 124 includes a hub portion that has multiple cogs 404 and slots 402 (also referred to as hubs) interposed between the cogs 404. In this embodiment, the manual override cam 216 is in a normal operating position (e.g., the manual override cam 216 is not being used to disengage the brake module 220 from the wheel 124).

In some embodiments, the driver 202 can trigger the pawl 214 to disengage from the wheel 124 by activating the solenoid 204. For example, the solenoid 204 is configured to retract (or pull) the solenoid pin 206 into the solenoid 204, e.g., when a current is applied to the solenoid 204 via the driver 202. As shown in FIG. 4A, when the solenoid pin 206 retracts, it pulls the pawl 214, disengaging the tooth 302 from the slot 402 of the wheel 124.

In some embodiments, the driver 202 can activate the electromagnet 208 to keep the pawl 214 disengaged from the wheel 124. For example, as shown in FIG. 4A, the retraction of the solenoid pin 206 into the solenoid 204 can push the magnetic plate 210 towards the electromagnet 208, such that the electromagnet 208 comes into contact with the magnetic plate 210. The electromagnet 208 is configured to retain (or hold) the magnetic plate 210 (e.g., while a current is applied to the electromagnet 208 via the driver 202), so that the solenoid pin 206 (and the tooth 302) is held in a disengaged (or retracted) position from the wheel 124. In one embodiment, after the magnetic plate 210 comes into contact with the electromagnet 208, the driver 202 may deactivate (e.g., remove power from) the solenoid 204 while keeping the electromagnet 208 activated. Additionally, although not shown in FIG. 4A, the spring 212 may be compressed (from its equilibrium) as the magnetic plate 210 comes into contact with the electromagnet 208. The spring 212 may be held in a compressed state while the electromagnet 208 is activated.

Figure 4B:
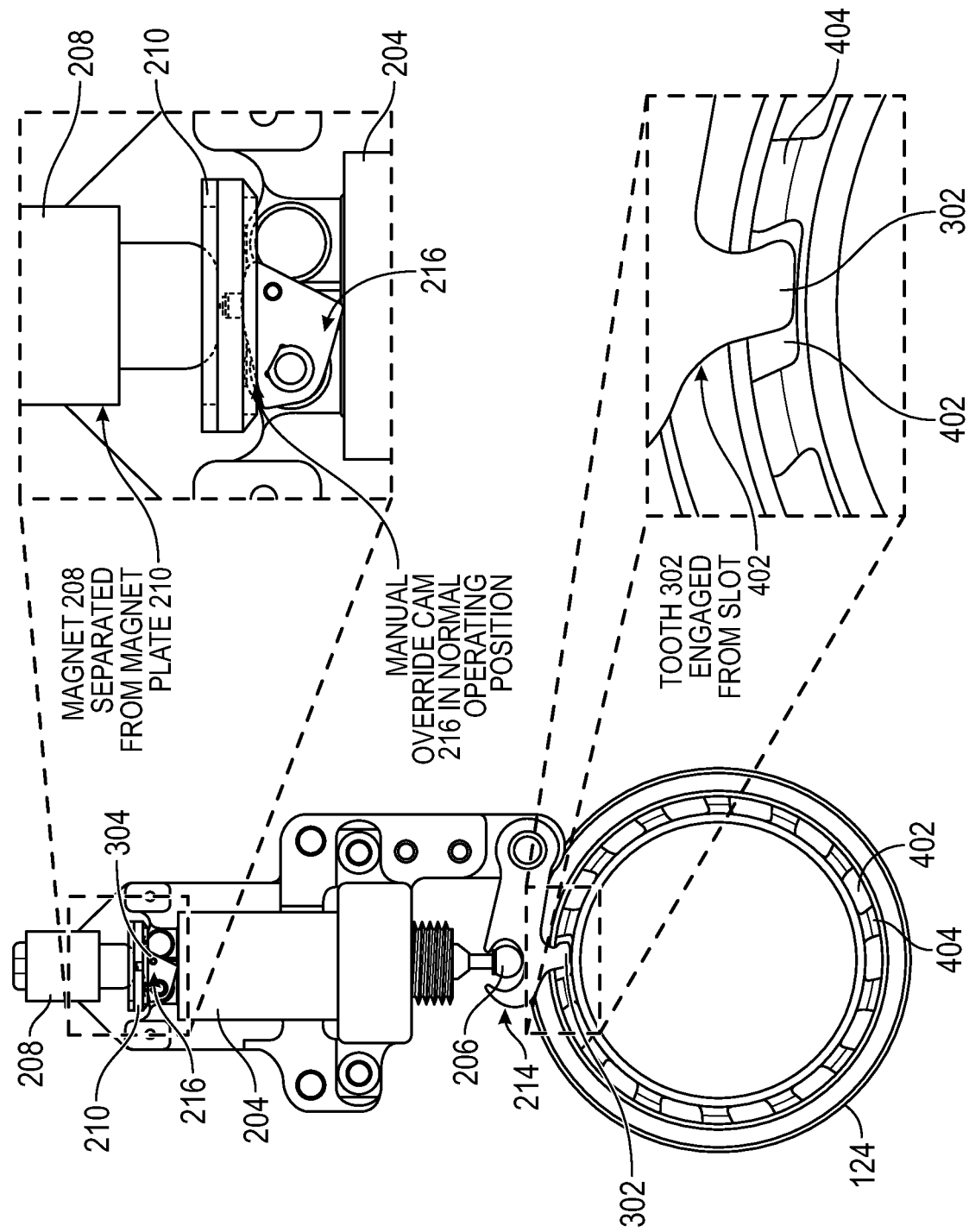
FIG. 4B illustrates an example brake module engaged with a wheel of a delivery device, according to one embodiment.

FIG. 4B illustrates an example configuration of a brake module 220 engaged with a wheel 124 of a delivery device 104, according to one embodiment. In this embodiment, the manual override cam 216 is in a normal operating position.

In some embodiments, the driver 202 can trigger the pawl 214 to engage the wheel 124 by deactivating the electromagnet 208. Here, as noted above with respect to FIG. 4A, the driver 202 may have already deactivated the solenoid 204 (e.g., when the magnetic plate 210 came into contact with the electromagnet 208). The deactivation of the electromagnet 208 can occur in cases of a command from the controller 120 (e.g., in response to detecting a hazard 106, in response to the delivery device 104 being parked, etc.) and/or in cases of a power failure (e.g., when the delivery device 104 and/or the brake module 220 loses power). When the electromagnet 208 is deactivated (e.g., due to a command or power failure), the electromagnet 208 stops retaining the magnetic plate 210. This in turn causes the spring 212 (which is in a compressed state) to push the magnetic plate 210 towards the solenoid 204, forcing the solenoid pin 206 back through the solenoid 204 so that the tooth 302 of the pawl 214 can engage a slot 402 of the wheel 124 (e.g., as shown in FIG. 4B). Note, for the sake of clarity, the spring 212 is not shown in FIG. 4B.

Figure 4C:
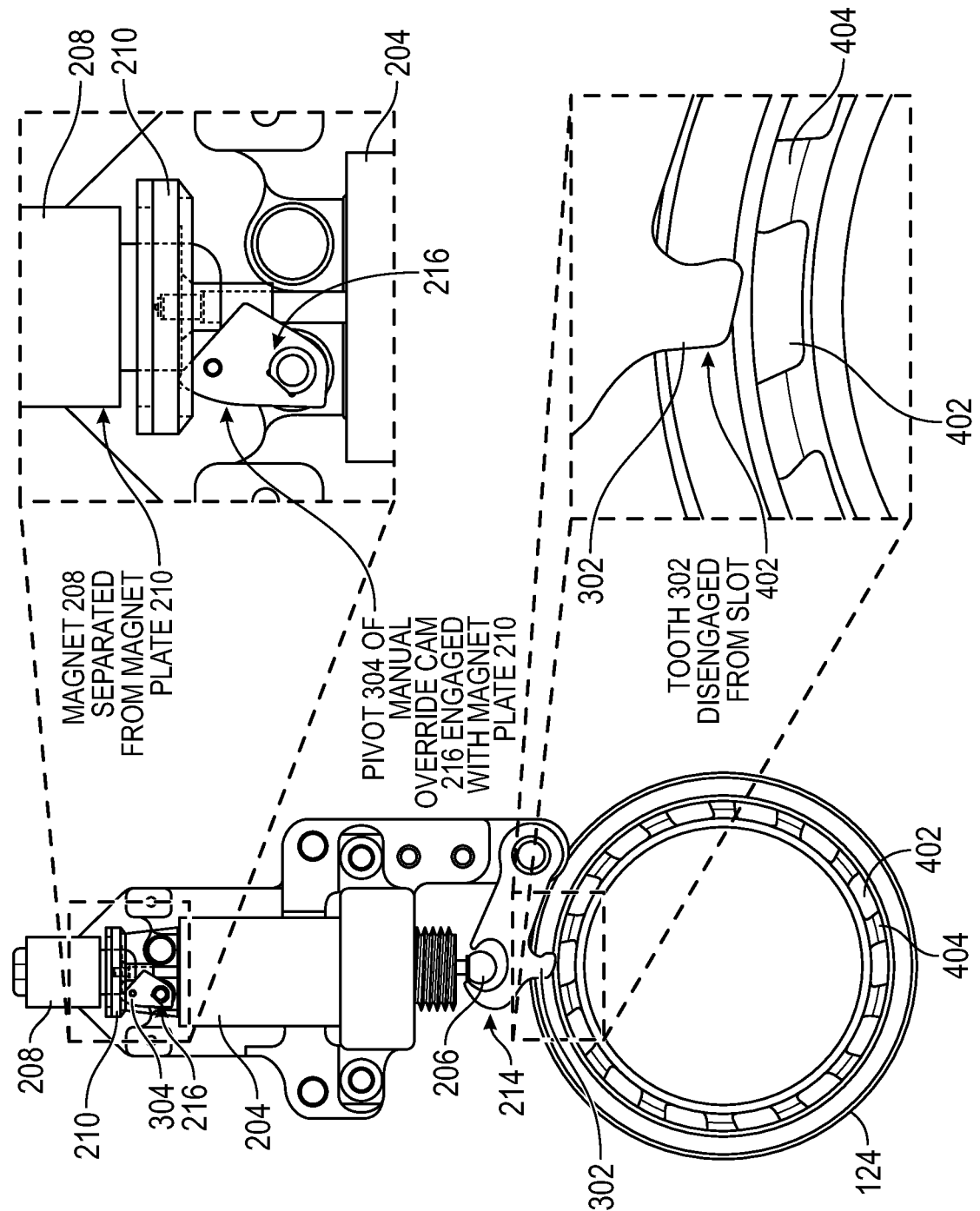
FIG. 4C illustrates another example brake module disengaged from a wheel of a delivery device, according to one embodiment.

FIG. 4C illustrates another example configuration of a brake module 220 disengaged from a wheel 124 of a delivery device 104, according to one embodiment. In this embodiment, the manual override cam 216 can be manually rotated (e.g., by a user applying a force to a lever coupled to the shaft 306 attached to the manual override cam 216) to enable a manual override state of the brake module 220. When the manual override cam 216 is rotated to an over cam position, it causes the pawl 214 to disengage from the wheel 124.

More specifically, the manual override cam 216 can be rotated, via the shaft 306, such that the pivot 304 engages the magnetic plate 210. In one embodiment, the pivot 304 may engage the magnetic plate 210 in a detent region of the magnetic plate 210. When the manual override cam 216 is engaged with the magnetic plate 210, the magnetic plate 210 may move towards the electromagnet 208, retracting the solenoid pin 206 through the solenoid 204 and disengaging the tooth 302 of the pawl 214 from a slot 402 of the wheel 124. In this embodiment, although the magnetic plate 210 may be displaced towards the electromagnet 208 when the manual override cam 216 is engaged with the magnetic plate 210, the magnetic plate 210 may still be separated from the electromagnet 208. This separation between the magnetic plate 210 and the electromagnet 208 (when the manual override state is enabled) may allow for electrically disabling the manual override state in the event power is supplied to the brake module 220 while the manual override state is enabled. Although not shown in FIG. 4C, the rotation of the manual override cam from its normal operating position to the position where it is engaged with the magnetic plate 210 can pre-load a spring 218 (e.g., torsion spring). As described below, this torsion spring can be used to aid the return of the manual override cam 216 from its over cam position (e.g., at the detent region 250) to its normal operating position.

Note that the configuration of the manual override cam 216 and the configuration of the magnetic plate 210 depicted in FIGS. 4A-4C are different than the configuration of the manual override cam 216 and the configuration of the magnetic plate 210 depicted in FIGS. 3A-3C, respectively. In FIG. 4C, for example, the manual override cam 216 has a different shaped pivot 304 than the pivot 304 depicted in FIGS. 3A-3C. Similarly, the magnetic plate 210 in FIG. 4C has a different configuration of the detent region 350 compared to the detent region 350 of the magnetic plate 210 in FIGS. 3A-3C. Here, in particular, the detent region 350 is configured as a groove or a trench (within the magnetic plate 210) which is where the pivot 304 engages the magnetic plate 210.

In some embodiments, the braking system 126 may support an automatic manual override return mechanism that can disable the manual override state of a brake module(s) 220, in the event the delivery device 104 is powered on while the manual override state for the brake module(s) 220 is enabled. For example, in embodiments described herein, powering on the brake module 220 (while the manual override state is enabled) activates the solenoid 204 and the electromagnet 208. When the solenoid 204 is activated, it retracts the solenoid pin 206 further into the solenoid 204, pushing the magnetic plate 210 into contact with the electromagnet 208. Because the magnetic plate 210 is still separated from the electromagnet 208 when the manual override state is enabled (e.g., as shown in FIG. 4C), the remaining displacement of the magnetic plate 210 towards the electromagnet 208 is sufficient to dislodge the pivot 304 of the manual override cam 216 from the detent region 350 of the magnetic plate 210. Once the manual override cam 216 is disengaged, the pre-loaded spring 218 returns the manual override cam 216 to its normal operating position, while the electromagnet 208 (which is activated via the driver 202) retains the pawl 214 in a disengaged position from the wheel 124. At this point, the brake module may be powered, the manual override state may be disabled, and the brake module may be disengaged (e.g., similar to the configuration shown in FIG. 4A). In this manner, the manual override state of a brake module 220 can be electrically disabled and the brake module 220 can be electrically disengaged in the event power is supplied to the brake module 220 (e.g., greater than a threshold power) when the manual override state is enabled on the brake module 220.

More details describing the manual override state of the brake module, the enabling of the manual override state, and the automatic disabling of the manual override state can be found in U.S. patent application Ser. No. 17/118,167, filed Dec. 10, 2020, which is expressly incorporated by reference herein.

As noted above, to mitigate against safety incidents, the controller 120 can be configured to perform a test of each brake module 220 within a delivery device 104. For example, there may situations in which at least one brake module 220 of the delivery device 104 is not operating according to a predetermined standard (e.g., due to mechanical failure, damage, etc.). In some cases, for example, a brake module 220 may not fully engage with a wheel 124 of the delivery device (e.g., the pivot 304 of the pawl 214 may not be engaged in a slot 402 of the wheel 124). In these cases, the brake module 220 may not be able to stop the movement (e.g., rotation) of the wheel 124 in the event the brake module 220 is triggered to engage the wheel 124.

Figure 5:
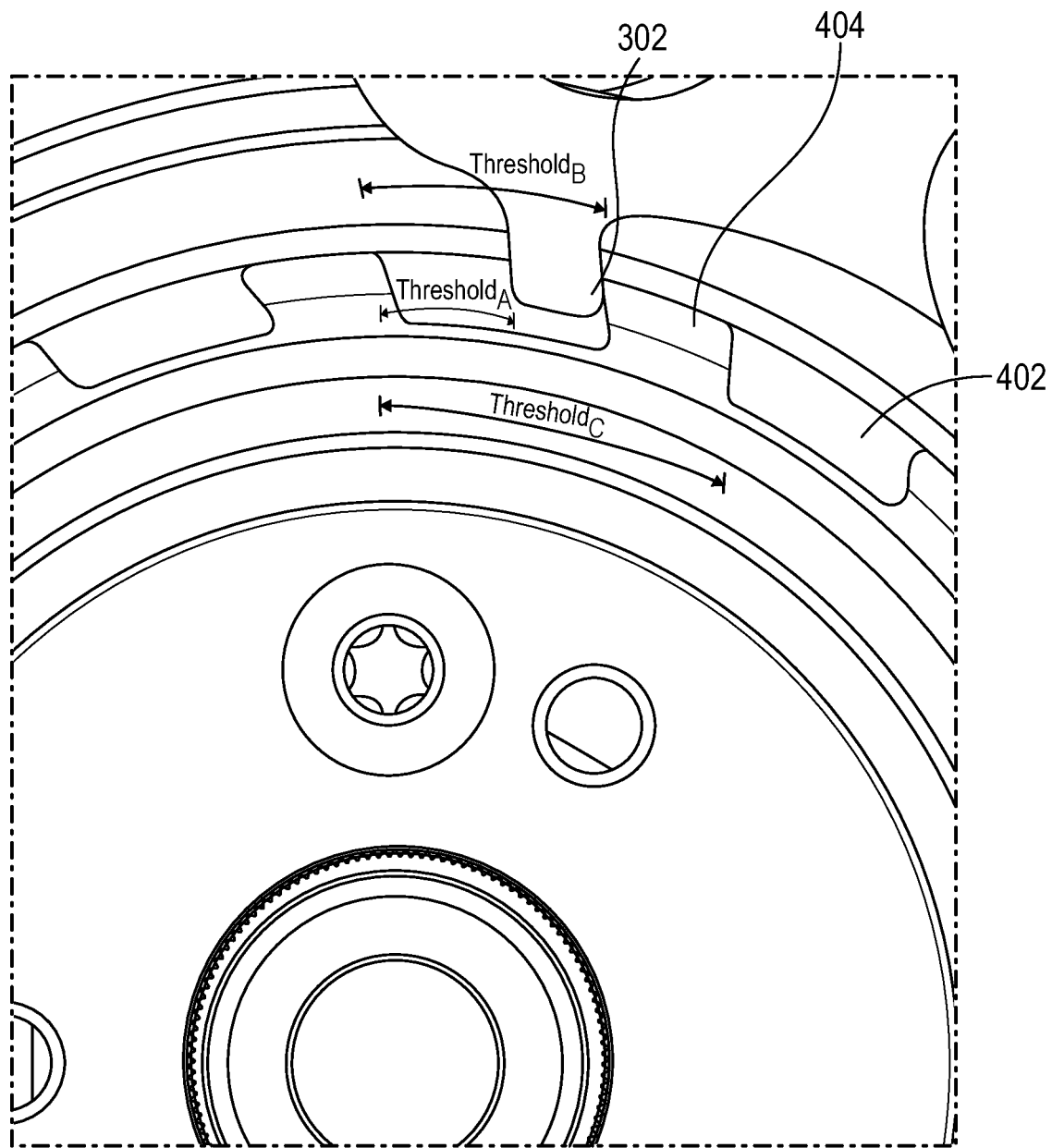
FIG. 5 illustrates an example of parameters for testing a brake module of a delivery device, according to one embodiment.

In some embodiments, the controller 120 (via the braking test component 132) can test a brake module 220 by rotating the wheel 124 (associated with the brake module 220) while the brake module 220 is engaged with the wheel 124 and monitoring the rotation of the wheel 124. The controller 120 can determine whether the brake module 220 passes or fails the test, based on the amount of rotation of the wheel 124. Referring to FIG. 5, for example, the controller 120 can evaluate the rotation of the wheel 124, based on one or more of the threshold parameters $Threshold_A$, $Threshold_B$, and $Threshold_C$. In one embodiment, $Threshold_A$ is the amount of degrees the wheel 124 can rotate, when the pivot 302 of the pawl 214 is engaged and meshed with a slot 402 of the wheel 124.

In some cases, the brake module 220 may be engaged, but the pivot 302 of the pawl 214 may not be engaged in a slot 402 of the wheel 124. For example, in some cases, the pivot 302 may have landed on one of the cogs 404 when the brake module 220 was engaged. In these instances, the wheel 124 (during the test) may rotate an amount of degrees greater than $Threshold_A$. Accordingly, in some embodiments, the controller 120 can evaluate the rotation of the wheel 124 (e.g., during the test), based on $Threshold_B$ and/or $Threshold_C$. In one embodiment, $Threshold_B$ is the amount of degrees the wheel 124 can rotate, when the pivot 302 of the pawl 214 is in contact with a cog 404 at an edge of the cog 404 proximal to the slot 402 (e.g., as shown in FIG. 5). In one embodiment, $Threshold_C$ is the amount of degrees the wheel 124 can rotate, when the pivot 302 of the pawl 214 is in contact with a cog 404 at an edge of the cog 404 distal to the slot 402 (e.g., as shown in FIG. 5).

In general, $Threshold_A$ may be less than or equal to $Threshold_B$, which may be less than or equal to $Threshold_C$. In one particular embodiment, $Threshold_A$ is approximately 9 degrees, $Threshold_B$ is approximately 15 degrees, and $Threshold_C$ is approximately 25 degrees.

Figure 6:
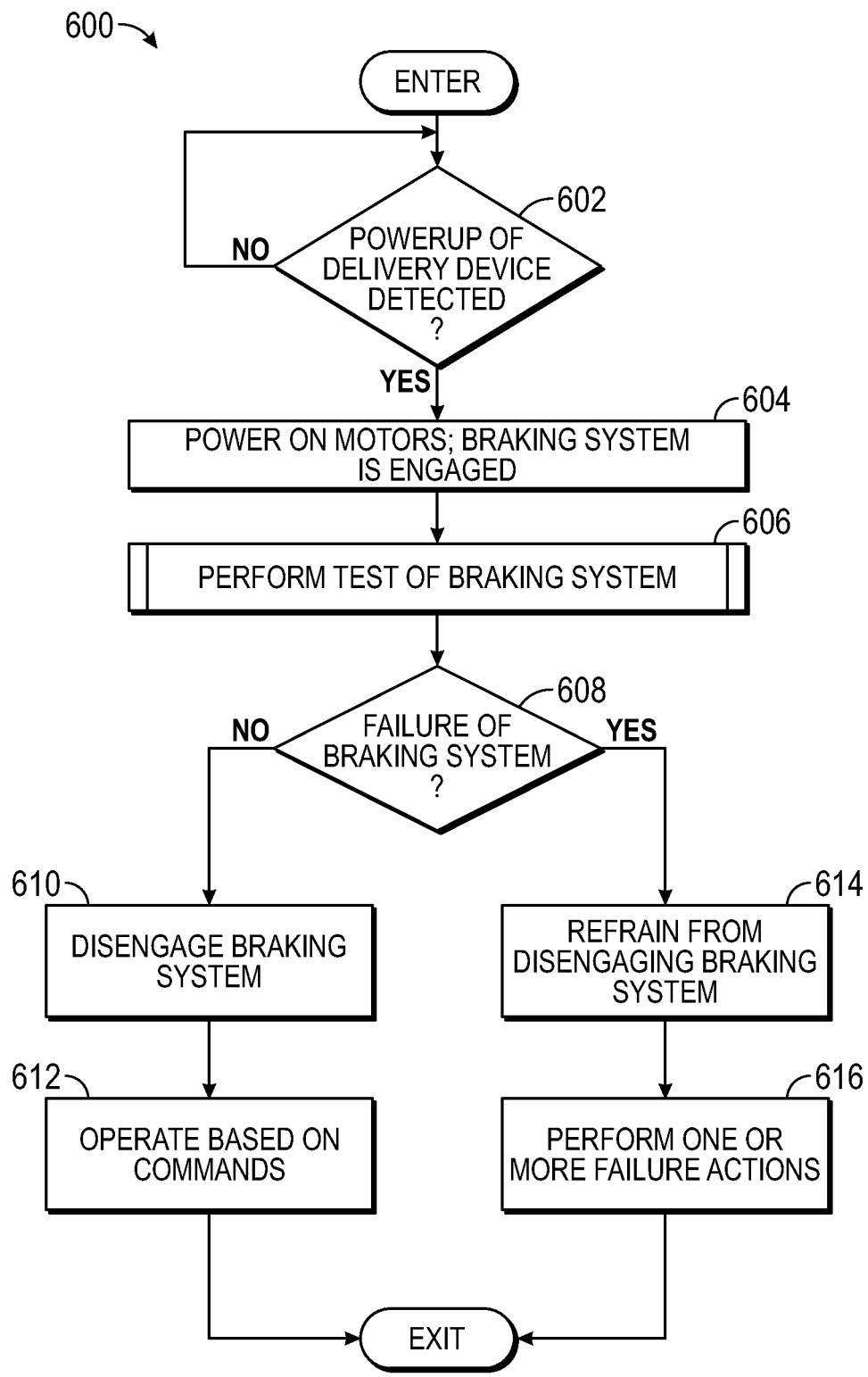
FIG. 6 is a flowchart of a method for controlling a delivery device, according to one embodiment.

FIG. 6 is a flowchart of a method 600 for controlling a delivery device (e.g., delivery device 104), according to one embodiment. The method 600 may be performed by one or more components (e.g., braking test component 132) of a controller (e.g., controller 120).

Method 600 enters at block 602, where the controller determines whether a power up of the delivery device has been detected. If a power up has not been detected, the method 600 remains at block 602. Once the power up is detected, the controller powers on the motors (e.g., motors 122) of the delivery device, while keeping the braking system (e.g., braking system 126) of the delivery device engaged (block 604). In one embodiment, the controller powers on all the motors of the delivery device in order to prepare the motors to drive all of the wheels of the delivery device during a test of the braking system. While powering the motors, the controller may keep the braking system in an unpowered state (e.g., via the drivers 202 of the brake modules of the braking system) in order to keep the braking system engaged with one or more wheels of the delivery device. In some embodiments, the controller may power on a subset of the motors of the delivery device. For example, in these embodiments, the controller may power on only the motors for the wheels that are configured to engage with a braking module (e.g., braking module 220).

At block 606, the controller performs a test of the braking system (e.g., braking system 126) of the delivery device. At block 608, the controller determines whether the test performed at block 606 indicates a failure of the braking system (e.g., the braking system failed the test). If the test does indicate a failure of the braking system, then the controller refrains from disengaging the braking system (block 614). At block 616, the controller performs one or more failure actions. The failure action(s) may include, but are not limited to, disabling the delivery device (e.g., putting the delivery device into an inactive state, powering down the motors of the delivery device, preventing the delivery device from accepting movement commands, etc.), communicating information regarding the state of the delivery device to a control system (e.g., control system 110), activating lights of the delivery device to indicate that the delivery device has failed, initiating a recovery operation of the delivery device, alerting maintenance personnel, etc.

On the other hand, if at block 608, the controller determines that braking system passed the test, then the controller disengages the braking system (block 610). At block 612, the controller may then proceed to operate the delivery device, e.g., based on commands received from the control system. The method 600 may then exit.

Figure 7:
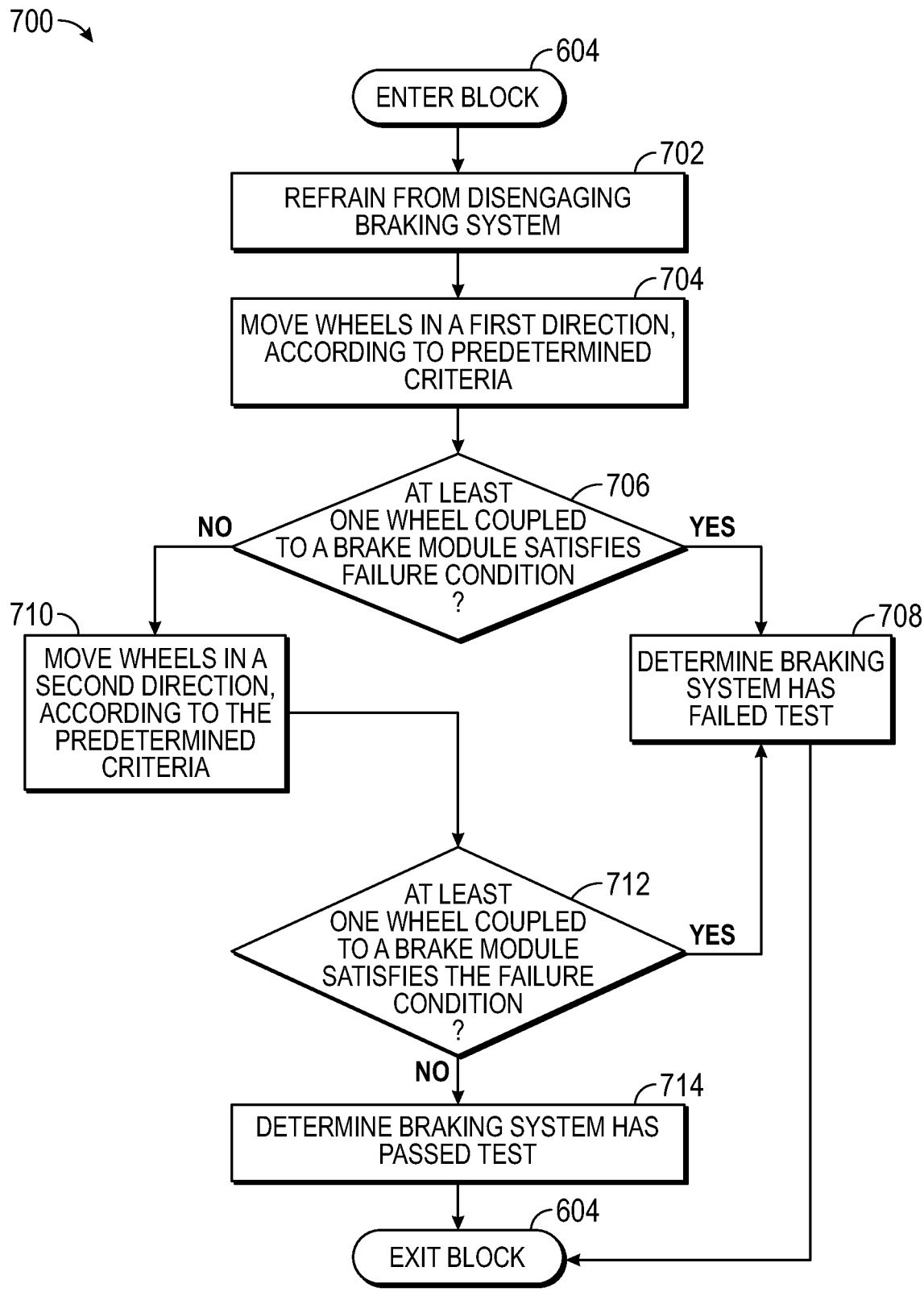
FIG. 7 is a flowchart of a method for performing a test of a braking system of a delivery device, according to one embodiment.

FIG. 7 is a flowchart of a method 700 for performing a test of a braking system (e.g., braking system 126) of a delivery device (e.g., delivery device 104), according to one embodiment. The method 700 may be performed by one or more components (e.g., braking test component 132) of a controller (e.g., controller 120). In one embodiment, the method 700 may be performed as part of block 606 of method 600 illustrated in FIG. 6.

Method 700 may enter at block 702, where the controller refrains from disengaging the braking system of the delivery device. That is, the controller may not automatically disengage the braking modules (e.g., braking modules 220) coupled to the wheels (e.g., wheels 124) of the delivery device, in response to detecting a power up of the delivery device and/or the motors (e.g., motors 122). Instead, the controller may wait until the test of the braking system has completed before determining whether to disengage the braking system.

At block 704, the controller moves (or drives) (e.g., via the motors) the wheels in a first direction (e.g., forward direction), according to set of predetermined criteria. In one embodiment, the controller (at block 704) moves (via the motors) all of the wheels of the delivery device in the first direction, according to the set of predetermined criteria. That is, the controller can drive each wheel that is coupled to a brake module and drive each wheel that is not coupled to a brake module. The predetermined criteria, for example, may include a predetermined speed (e.g., revolutions per minute (RPM)), target angle, predetermined amount of time, etc.

In one embodiment, the predetermined criteria that the controller uses (e.g., in block 704) is based on a control mode for the motors of the delivery device. For example, the delivery device may support one or more control modes for the motors, including, for example, a velocity control mode and a position control mode. In the velocity control mode, the controller can drive each of the motors by instructing the motor to turn the wheel in a particular direction (e.g., forwards or backwards) at a predetermined speed (e.g., X RPM) for a predetermined amount of time (e.g., Y seconds). In the position control mode, the controller can drive each of the motors by instructing the motor to turn the wheel in a particular direction (e.g., forwards or backwards) to a target angle (e.g., Z degrees).

At block 706, the controller determines whether at least one wheel coupled (or engaged) to a brake module satisfies a failure condition. In one embodiment, the failure condition is an amount of rotation exceeding a specified amount of rotation. For example, the controller can monitor the movement (e.g., rotation) of each wheel coupled to a different brake module to determine whether the movement of the wheel exceeds one or more threshold parameters (e.g., $Threshold_A$, $Threshold_B$, $Threshold_C$). Assuming the motors of the delivery device are operating in velocity control mode, the controller can determine whether the amount of rotation (based on the target speed and predetermined amount of time) of each wheel coupled to a brake module exceeds the threshold parameter (e.g., $Threshold_C$). Assuming the motors of the delivery device are operating in position control mode, the controller can determine whether each wheel coupled to a brake module exceeds the target angle, which can be set to the threshold parameter (e.g., $Threshold_C$). In one embodiment, if the controller determines that the amount of rotation of a wheel coupled to a brake module exceeds a specified amount of rotation (e.g., $Threshold_C$), then the controller can determine that the braking module is not operating properly.

If the controller determines that at least one wheel coupled to a brake module satisfies the failure condition, then the controller determines that the braking system has failed the braking system test (block 708). Note, however, in other embodiments, the controller can determine whether the braking system has failed based on a different conditions. For example, instead of determining a failure based on at least one of the wheels satisfying the failure condition, the controller can determine a failure if a number of wheels that satisfy the failure condition is greater than or equal to a predetermined number (e.g., two, three, etc.). After block 708, the method 700 may exit.

If the controller determines that none of the wheels coupled to a brake module satisfies the failure condition, then the controller moves the wheels of the delivery device in a second direction (e.g., backwards direction), according to the predetermined criteria (block 710). In one embodiment, the controller (at block 710) moves (via the motors) all of the wheels of the delivery device in the second direction, according to the set of predetermined criteria. That is, the controller can drive each wheel that is coupled to a brake module and drive each wheel that is not coupled to a brake module. For example, the controller may instruct each motor of the delivery device to (1) turn its respective wheel in the second direction at a predetermined speed (e.g., X RPM) for a predetermined amount of time (e.g., Y seconds) or (2) turn its respective wheel in the second direction to a target angle (e.g., Z degrees). In one embodiment, the controller may perform the second movement operation (e.g., at block 710) to account for scenarios where the movement of one or more wheels of the delivery device (at block 704) is halted due to a physical obstruction (e.g., as opposed to a functioning braking system). At block 712, the controller determines whether at least one wheel coupled to a brake module satisfies the failure condition. The operations in block 712 may be similar to the operations in block 706 described above.

If the controller determines that at least one wheel coupled to a brake module satisfies the failure condition, then the controller determines the braking system has failed the braking system test (block 708). As described above, however, in other embodiments, the controller can determine whether the braking system has failed based on different conditions. On the other hand, if the controller determines that none of the wheels coupled to a brake module satisfies the failure condition, then the controller determines the braking system has passed the braking system test (block 714). The method 700 may then exit.

In some embodiments, the controller 120 may perform a test of the braking system 126 of a delivery device 104, while the delivery device 104 is in the dispenser 102. In these scenarios, the delivery device 104 may be in close proximity to other delivery devices 104 and may have to perform a test without coming into contact with the other delivery devices 104. Accordingly, embodiments provide techniques that can perform a test of a braking system on a delivery device while the delivery device is in a dispenser 102 (or another crowded area).

Figure 8:
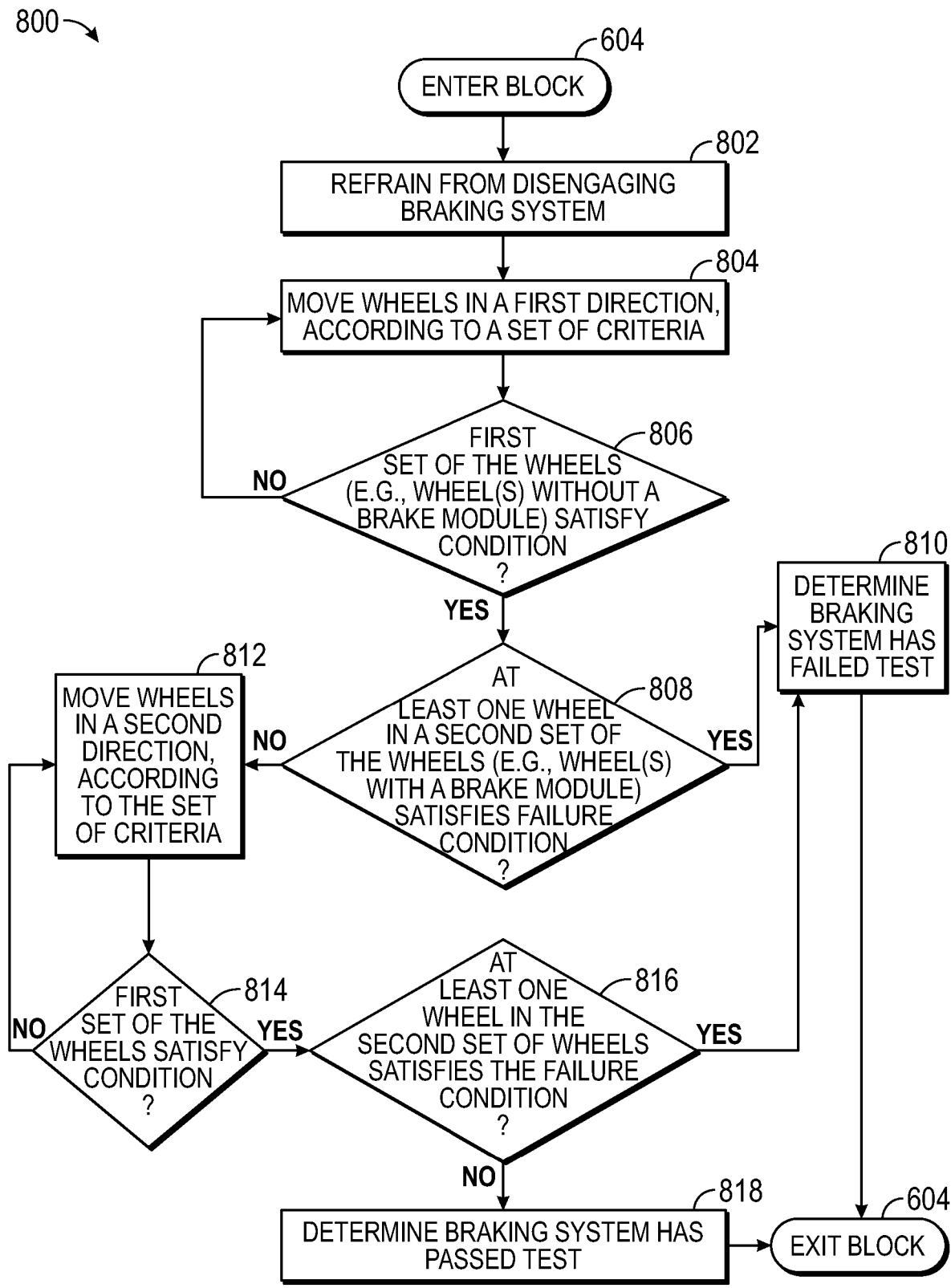
FIG. 8 is a flowchart of another method for performing a test of a braking system of a delivery device, according to one embodiment.

FIG. 8 is a flowchart of another method 800 for performing a test of a braking system (e.g., braking system 126) of a delivery device (e.g., delivery device 104), according to one embodiment. The method 800 may be performed by one or more components (e.g., braking test component 132) of a controller (e.g., controller 120). In one embodiment, the method 800 may be performed as part of block 606 of method 600 illustrated in FIG. 6.

Method 800 may enter at block 802, where the controller refrains from disengaging the braking system of the delivery device. That is, the controller may not automatically disengage the braking modules (e.g., braking modules 220) coupled to the wheels (e.g., wheels 124) of the delivery device, in response to detecting a power up of the delivery device and/or the motors (e.g., motors 122). Instead, the controller may wait until the test of the braking system has completed before determining whether to disengage the braking system.

At block 804, the controller moves (or drives) (e.g., via the motors) the wheels in a first direction (e.g., forward direction), according to set of predetermined criteria. In one embodiment, the controller (at block 804) moves (via the motors) all of the wheels of the delivery device in the first direction, according to the set of predetermined criteria. That is, the controller can drive each wheel that is coupled to a brake module and drive each wheel that is not coupled to a brake module. The predetermined criteria, for example, may include a predetermined speed (e.g., revolutions per minute (RPM)), target angle, predetermined amount of time, etc. For example, similar to block 704, the predetermined criteria that the controller uses can be based on a control mode (e.g., velocity control mode, position control mode) for the motors of the delivery device.

At block 806, the controller determines whether a first set of the wheels satisfy a predetermined condition. The first set of wheels, e.g., may be the wheels of the delivery device that do not have a brake module. The controller may monitor the amount of rotation of the first set of wheels to determine whether each of the first set of wheels has achieved a target amount of rotation (e.g., X degrees+$\Delta$ degrees). In one embodiment, X degrees is set based on a threshold parameter (e.g., $Threshold_A$, $Threshold_B$, $Threshold_C$) and $A \geq \Delta \leq B$, where A is set to reduce chances of a false positive and B is set to reduce the chances of the delivery device coming into contact with another delivery device (e.g., within the dispenser 102).

If the controller determines that the first set of wheels have not satisfied the condition, then the controller continues to drive all of the wheels (block 804). When the controller determines that the first set of wheels have satisfied the condition, then the controller evaluates each of the wheels in a second set of wheels to determine whether at least one of the wheels in the second set of wheels satisfies a failure condition (block 808). The second set of wheels, e.g., may be the wheels of the delivery device that include a brake module. Here, the controller can monitor the amount of rotation of each of the second wheels to determine if the amount of rotation of the wheel exceeds a target amount of rotation (e.g., X degrees set based on a threshold parameter). If the controller determines that at least one of the second set of wheels satisfies the failure condition, the controller determines that the brake module coupled to that wheel is not working properly, and determines that the test of the braking system has failed (block 810). The method 800 may then exit.

On the other hand, if the controller determines that none of the wheels in the second set of wheels satisfies the failure condition, then the controller moves the wheels of the delivery device in a second direction, according to the set of criteria (block 812). The operation at block 812 may be similar to the operation in block 804, except in the second direction. At block 814, the controller determines whether the first set of wheels (e.g., wheels without a brake module) satisfy a condition (e.g., amount of rotation has achieved a target amount of rotation, X degrees+$\Delta$ degrees).

If the controller determines that the first set of wheels have not satisfied the condition, then the controller continues to drive all of the wheels (block 812). When the controller determines that the first set of wheels have satisfied the condition, then the controller evaluates each of the wheels in a second set of wheels to determine whether at least one of the wheels in the second set of wheels satisfies a failure condition (block 816). The operation in block 816 may be similar to the operation in block 808. If the controller determines that at least one of the second set of wheels satisfies the failure condition, the controller determines that the test of the braking system has failed (block 810). Otherwise, the controller determines that the test of the braking system has passed (block 818). The method 800 then exits.

As noted, the braking system 126 of the delivery device 104 is generally configured to be engaged when the braking system 126 is unpowered (e.g., due to the delivery device 104 being powered off, due to a command received from the controller 120, etc.). This braking system configuration can ensure that the delivery device 104 does not move when it is not in use (e.g., the delivery device 104 may be parked). In some scenarios, however, a user may want to move the delivery device 104 while it is powered off (e.g., the user may be performing maintenance on the delivery device, the user may be testing the delivery device, manually transporting the delivery device to a location, etc.). In these scenarios, the user can put the braking system 126 in a manual override state (also referred to as a manual released mode), which disengages the brake modules 220 and allows the user to manually move the delivery device when the braking system 126 is unpowered.

More specifically, each brake module 220 can include a manual override cam 216, which (1) allows a user to manually disengage the brake module 220 from a respective wheel 124, e.g., when the brake module 220 is engaged with the wheel 124, and (2) manually engage the brake module 220 with the respective wheel 124, e.g., when the brake module 220 is disengaged with the wheel 124. The manual override cam 216 of each brake module 220 may be coupled to a lever accessible to the user. When the user wants to move the delivery device 104 (while it is unpowered), the user can engage the lever (e.g., by pulling up on the lever). As the lever is engaged, it rotates the manual override cam 216 to a position where it engages and displaces the magnetic plate 210 towards the electromagnet 208, disengaging the pawl 214 from the wheel 124 (e.g., as shown in FIG. 4C).

In some scenarios, a user may attempt to power on the delivery device 104, while one or more of the brake modules 220 is in the manual override state. For example, the user may have forgotten to manually disable the manual override state (e.g., by disengaging the lever coupled to the manual override cam 216). In these scenarios, the power up of the delivery device 104 can trigger the test of the braking system 126 to be performed while one or more the brake modules 220 is in the manual override state (and therefore disengaged from the respective wheels 124 of the delivery device 104). The test of the braking system 126 would then fail, since the amount of rotation of the respective wheels coupled to a brake module in the manual override state would be greater than a threshold.

To address this, embodiments described herein provide techniques to ensure that the power-on self-test is performed when the manual override state for any brake module is disabled (or deactivated). In particular, embodiments can perform an initialization sequence to place the braking system in a known state (e.g., disabled state) with respect to manual override. Specifically, at startup, the initialization sequence (1) electronically disengages the brake modules and then (2) electronically engages the brake modules. This initialization sequence ensures that the manual override state is disabled and that braking system is engaged before the test of the braking system is initiated.

Figure 9:
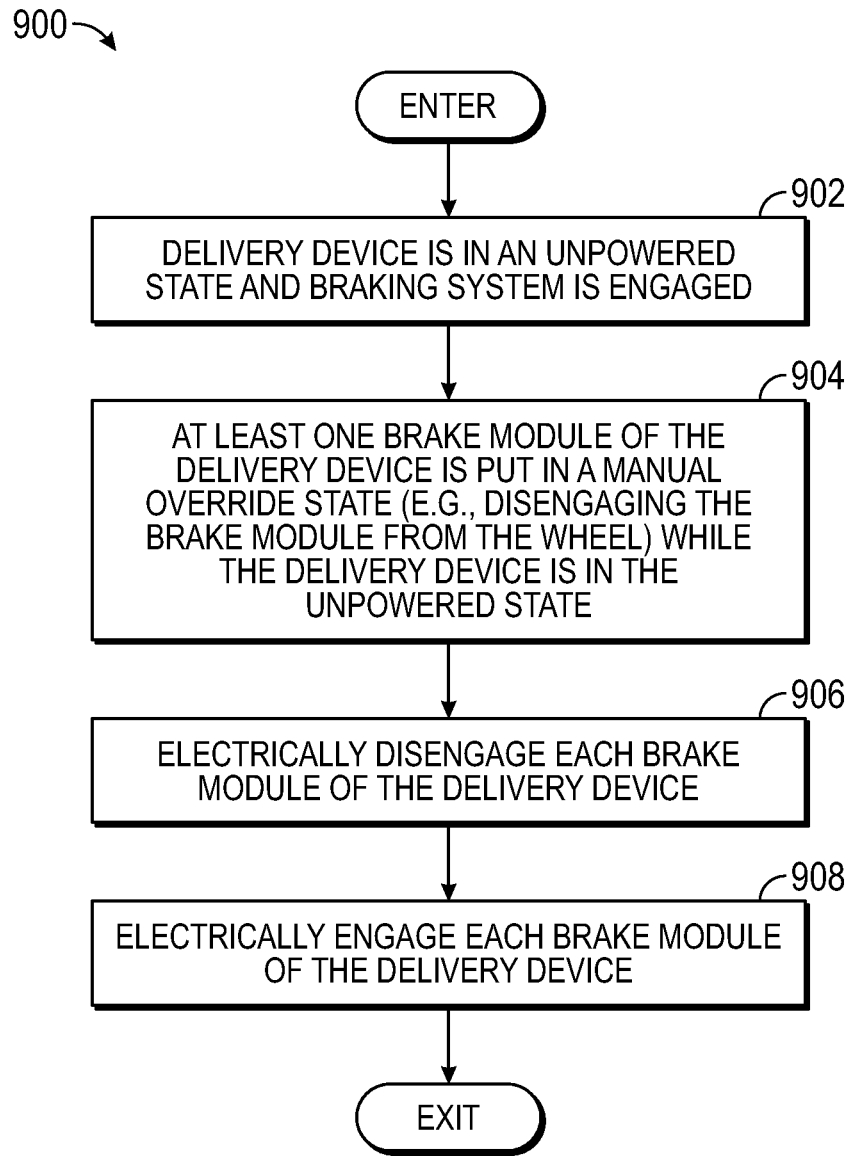
FIG. 9 is a flowchart of a method for performing an initialization sequence for a test of a braking system of a delivery device, according to one embodiment.

FIG. 9 is a flowchart of a method 900 for performing an initialization sequence for a test of a braking system (e.g., braking system 126) of a delivery device (e.g., delivery device 104), according to one embodiment. One or more operations of the method 800 may be performed by one or more components (e.g., braking test component 132) of a controller (e.g., controller 120).

Method 900 enters at block 902, where the delivery device is in an unpowered state and the braking system is engaged. At block 904, a user puts at least one brake module (e.g., brake module 220) of the delivery device in a manual override state (thereby manually disengaging the brake module from the respective wheel 124 of the delivery device), while the delivery device is in the unpowered state.

At block 906, the controller electronically disengages each brake module of the delivery device (e.g., via the driver 202 of each brake module). In particular, the controller may trigger each driver to activate the solenoid (e.g., solenoid 204) and electromagnet (e.g., electromagnet 208) for the respective brake module. In one embodiment, the controller may perform block 906, upon detecting a power up of the delivery device and the motors (e.g., motors 122) for the delivery device.

In one embodiment, the activation of the solenoid and the electromagnet (at block 906) can automatically disable the manual override state for the brake module. For example, the activation of the solenoid 204 retracts the solenoid pin 206 into the solenoid 204. This retraction of the solenoid pin 206, in turn, pushes the magnetic plate 210 into contact with the electromagnet 208, allowing the manual override cam 216 to return to its nominal operating position via a torsion spring. Additionally, the activation of the electromagnet 208 holds the magnetic plate 210 in contact with the electromagnet 208, keeping the pawl 214 disengaged from the wheel 124. The solenoid 204 may be powered off (e.g., deactivated via the driver) while the electromagnet is still activated to keep the pawl 214 disengaged from the wheel 124.

At block 908, the controller electronically engages each brake module of the delivery device (e.g., via the driver 202 of each brake module). In particular, the controller may trigger each driver to deactivate the electromagnet for the respective brake module. In one embodiment, the deactivation of the electromagnet can stop the force holding the magnetic plate in contact with the electromagnet, allowing a return spring (e.g., spring 212) to push against the magnetic plate and engage the pawl (e.g., pawl 214) of the brake module with the wheel of the delivery device. The method 900 may then exit. For example, in some embodiments, the test of the braking system is performed after block 908.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An autonomous delivery robot, comprising:
a plurality of wheels;

a plurality of motors, each of the plurality of motors being configured to rotate a different one of the plurality of wheels;

a braking system comprising a plurality of brake modules, each of the plurality of brake modules being configured to engage a different wheel of a first subset of the plurality of wheels to stop movement of the wheel when the brake module is unpowered; and a controller configured to perform an operation to test the braking system upon a power up of the autonomous delivery robot, the operation comprising:

instructing each of the plurality of motors to drive its respective wheel in a first direction, while the plurality of brake modules are engaged with the first subset of the plurality of wheels;

monitoring, for each of the first subset of the plurality of wheels, a first amount of rotation of the wheel, while each of the plurality of wheels is driven in the first direction;

upon determining that the first amount of rotation for each of the first subset of the plurality of wheels is less than a predetermined amount of rotation, instructing each of the plurality of motors to drive its respective wheel in a second direction, while the plurality of brake modules are engaged with the first subset of the plurality of wheels;

monitoring, for each of the first subset of the plurality of wheels, a second amount of rotation of the wheel, while each of the plurality of wheels is driven in the second direction; and upon determining that the second amount of rotation of at least one of the wheels in the first subset of the plurality of wheels is greater than the predetermined amount of rotation, (i) determining that a test of the braking system has failed and (ii) performing at least one action, based on the determination that the test of the braking system has failed.

2. The autonomous delivery robot of claim 1, wherein instructing each of the plurality of motors to drive its respective wheel comprises instructing each of the plurality of motors to drive its respective wheel to a predetermined angle.

3. The autonomous delivery robot of claim 1, wherein instructing each of the plurality of motors to drive its respective wheel comprises instructing each of the plurality of motors to drive its respective wheel at a predetermined speed for a predetermined amount of time.

4. The autonomous delivery robot of claim 1, wherein at least one of the first amount of rotation or the second amount of rotation is greater than the predetermined amount of rotation when a pawl of the brake module is disengaged with a slot of the respective wheel.

5. The autonomous delivery robot of claim 1, wherein the first amount of rotation or the second amount of rotation is less than the predetermined amount of rotation when the movement of the wheel is at least partially obstructed by a physical object in a travel path of the autonomous delivery robot.

6. The autonomous delivery robot of claim 1, wherein the at least one action comprises one or more of: (i) refraining from disengaging at least a second brake module of the plurality of brake modules; (ii) sending an indication that the test of the braking system has failed; and (iii) turning off power to the plurality of motors; and (iv) controlling lighting devices on the autonomous delivery robot to indicate that the autonomous delivery robot is in a disable state.

7. A computer-implemented method for performing a test of a braking system on an autonomous delivery robot, the computer-implemented method comprising:

moving each wheel of a plurality of wheels of the autonomous delivery robot in a first direction in accordance with predefined criteria, while one or more brake modules of the braking system are engaged to one or more wheels of the plurality of wheels to stop movement of the one or more wheels;

after moving each of the plurality of wheels in the first direction, determining a first amount of movement of at least a first wheel of the one or more wheels that is engaged to a first brake module of the one or more brake modules; and upon determining that the first amount of movement of the first wheel satisfies a predetermined condition, (i) determining that the test of the braking system has failed and (ii) refraining from disengaging the one or more brake modules of the braking system in response to determining that the test of the braking system has failed.

8. The computer-implemented method of claim 7, further comprising detecting a power up of the autonomous delivery robot, wherein each wheel of the plurality of wheels is moved in response to detecting the power up of the autonomous delivery robot.

9. The computer-implemented method of claim 7, further comprising upon determining that the first amount of movement of each of the one or more wheels does not satisfy the predetermined condition: (i) moving each wheel of the plurality of wheels in a second direction in accordance with the predefined criteria, while the one or more brake modules of the braking system are engaged to the one or more wheels to stop movement of the one or more wheels and (i) determining a second amount of movement of the first wheel that is engaged to the first brake module.

10. The computer-implemented method of claim 9, further comprising upon determining that the second amount of movement of the first wheel satisfies the predetermined condition, (i) determining that the test of the braking system has failed and (ii) refraining from disengaging the one or more brake modules of the braking system in response to determining that the test of the braking system has failed.

11. The computer-implemented method of claim 10, further comprising at least one of sending an indication that the test of the braking system has failed or instructing the autonomous delivery robot to transition to an inactive state, upon determining that the test of the braking system has failed.

12. The computer-implemented method of claim 10, further comprising sending a request to pick up the autonomous delivery robot upon determining that the test of the braking system has failed.

13. The computer-implemented method of claim 10, further comprising upon determining that the second amount of movement of each of the one or more wheels does not satisfy the predetermined condition, (i) determining that the test of the braking system has passed and (ii) disengaging each of the one or more brake modules of the braking system in response to determining that the test of the braking system has passed.

14. The computer-implemented method of claim 7, wherein the predefined criteria comprises a predefined speed and a predetermined amount of time.

15. The computer-implemented method of claim 7, wherein the predefined criteria comprises a target angle of rotation.

16. The computer-implemented method of claim 7, wherein the predetermined condition comprises exceeding a threshold amount of movement.

17. The computer-implemented method of claim 7, wherein the first brake module comprises a pawl configured to engage the first wheel in a slot of the first wheel to stop movement of the first wheel.

18. The computer-implemented method of claim 17, wherein the first amount of movement satisfies the predetermined condition when the pawl is disengaged from the slot of the first wheel.

19. A non-transitory computer-readable storage medium having computer-readable program code embodied therewith, the computer-readable program code executable by one or more computer processors to perform an operation for testing a braking system on an autonomous delivery robot, the operation comprising:

moving each wheel of a plurality of wheels of the autonomous delivery robot in a first direction in accordance with predefined criteria, while one or more brake modules of the braking system are engaged to one or more wheels of the plurality of wheels to stop movement of the one or more wheels;

after moving each of the plurality of wheels in the first direction, determining a first amount of movement of at least a first wheel of the one or more wheels that is engaged to a first brake module of the one or more brake modules; and upon determining that the first amount of movement of the first wheel satisfies a predetermined condition, (i) determining that a test of the braking system has failed and (ii) refraining from disengaging the one or more brake modules of the braking system in response to determining that the test of the braking system has failed.

20. The non-transitory computer-readable storage medium of claim 19, further comprising detecting a power up of the autonomous delivery robot, wherein each wheel of the plurality of wheels is moved in response to detecting the power up of the autonomous delivery robot.

\* \* \* \* \*